United States Patent
Kerr et al.

(10) Patent No.: US 7,119,962 B2
(45) Date of Patent: Oct. 10, 2006

(54) METHOD OF MANUFACTURING A MOLDED LENSLET ARRAY

(75) Inventors: Roger S. Kerr, Brockport, NY (US); Seung-Ho H. Baek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/640,201

(22) Filed: Aug. 13, 2003

(65) Prior Publication Data

US 2005/0036205 A1   Feb. 17, 2005

(51) Int. Cl.
*G02B 27/10* (2006.01)

(52) U.S. Cl. .................. 359/619; 359/621; 359/623

(58) Field of Classification Search ........... 359/619, 359/621, 623, 627, 639, 629, 622, 67; 355/53, 355/55, 86; 430/5, 22, 30
See application file for complete search history.

(56) References Cited

U.S. PATENT DOCUMENTS

| | | | |
|---|---|---|---|
| 4,339,209 A | 7/1982 | Tanigami | 400/142 |
| 4,440,846 A * | 4/1984 | Sanders et al. | 430/138 |
| 5,321,431 A * | 6/1994 | Takeno | 347/232 |
| 5,871,653 A * | 2/1999 | Ling | 216/2 |
| 6,034,712 A | 3/2000 | Iwasaki | 347/241 |
| 6,075,652 A * | 6/2000 | Ono et al. | 359/642 |
| 6,282,027 B1 * | 8/2001 | Hough | 359/618 |
| 6,381,072 B1 * | 4/2002 | Burger | 359/622 |
| 6,657,157 B1 * | 12/2003 | Altman et al. | 219/121.68 |
| 6,657,431 B1 * | 12/2003 | Xiao | 324/244 |
| 6,819,494 B1 * | 11/2004 | Liu et al. | 359/625 |
| 2002/0140918 A1 * | 10/2002 | Nakamura | 355/53 |
| 2003/0081312 A1 * | 5/2003 | Nemoto et al. | 359/454 |
| 2003/0207484 A1 * | 11/2003 | Nishikawa | 438/31 |
| 2003/0209040 A1 * | 11/2003 | Hashimoto et al. | 65/441 |

* cited by examiner

*Primary Examiner*—Alicia M. Harrington
*Assistant Examiner*—Brandi Thomas
(74) *Attorney, Agent, or Firm*—Nelson Adrian Blish

(57) ABSTRACT

An imaging apparatus (10) to image wise expose desired microcapsules (38) within a photosensitive media (44) with an image exposure device (12) to harden the desired microcapsules applying pressure to the exposed photosensitive media rupturing the unexposed microcapsule (40), releasing the image-forming material (48) encapsulated within to form an image on the photosensitive media, the exposure device having a molded lenslet array (14) with a printed lens mask improving channel cross talk, aberrations, and reducing flair.

8 Claims, 5 Drawing Sheets

METHOD OF MANUFACTURING A MOLDED LENSLET ARRAY

CROSS REFERENCE TO RELATED APPLICATIONS

Reference is made to commonly-assigned copending U.S. patent application Ser. No. 10/640,197, filed Aug. 13, 2003, entitled METHOD OF REGISTERING A MOLDED LENSLET ARRAY WITH AN ARRAY OF LIGHT EMITTING ELEMENTS, by Kerr et al., the disclosure of which is incorporated herein.

FIELD OF THE INVENTION

The present invention relates in general to the field of image exposure devices and more particularly to a method of masking a molded one-dimensional or two-dimensional lenslet array of an image exposure device to reduce channel cross talk, aberrations, and flair.

BACKGROUND OF THE INVENTION

Image exposure devices having light emitting elements have been used in imaging equipment to expose images on photosensitive media. Such a device is described in U.S. Pat. No. 6,034,712, which uses an array of light emitting light elements disposed within recesses formed in a substrate with a pinhole mask to expose an image on photosensitive media. The photosensitive media may be of the type having a plurality of microcapsules, with an image-forming material encapsulated within the microcapsules.

To form an image on a photosensitive media having microcapsules, a multiple channel image exposure device may be used to expose desired microcapsules with at least one of the multiple light emitting elements. Image wise exposure by the exposure device hardens the desired microcapsules such that when pressure is applied by means of a microcapsule-rupturing device only the unexposed microcapsules are ruptured. The ruptured microcapsules release an image-forming material encapsulated within to form an image within the photosensitive material. Similar imaging forming equipment is described in U.S. Pat. Nos. 4,440,846 and 4,339,209.

Image exposure devices having molded lenslets generally have a mask to reduce channel cross talk, aberrations, and flair. Depending on the application, the mask can become very important to the image quality of a completed image. Typically the mask is placed in the light path of the exposure device. Accuracy of the location and features of the mask may be required to be within a few microns to prevent blocking the light source or forming image artifacts in an image formed on the photosensitive media due to the alignment or accuracy of the mask. Alignment can become complicated and expensive as the number of imaging channels increases. Thus, there is a need for improved image quality and lower cost by improving the fabrication and alignment accuracy of a mask used in a multiple channel image exposure device.

SUMMARY OF THE INVENTION

Briefly, according to one aspect of the present invention a method of masking a molded lenslet array having an array of light emitting elements comprises printing a mask on the molded lenslet array to reduce channel cross talk aberrations, or flair in the in the exposure of a photosensitive media.

In one embodiment, the mask is printed on the input side of the molded lenslet array or the output side of the molded lenslet array, or both input and output sides of the molded lenslet array. In another embodiment, the mask may be printed on the molded lenslet array after the molded lenslet array has been molded or may be applied to the mold during the process of molding the molded lenslet array.

The present invention is intended to lower the cost while improving the image quality of an imaging apparatus that uses a multiple channel-imaging device to generate an image on or within a photosensitive media. In a preferred embodiment the invention is used with a photosensitive media having a polarity of microcapsules with an image-forming material encapsulated within the microcapsules. With image wise exposed by a multiple channel image exposure device, microcapsules sensitive to certain radiation become hardened to a point that when processed through a microcapsule rupturing device, the exposed microcapsules are not ruptured while the unexposed microcapsules that release the image-forming material encapsulated are ruptured to form an image on or within the photosensitive media.

The multiple channel image exposure device of the present invention is used to expose the photosensitive media. It utilizes a molded lenslet array aligned to an array of one-dimensional or two-dimensional multiple light emitting elements to form a multiple channel image exposure device. To improve the image quality of the multiple channel image exposure device, a mask is printed onto the surface of the molded lenslet array which lowers the cost of a multiple channel image exposure device by removing the need to accurately align a mask relative to the light source and the molded lenslet array in X-Y and Z directions. The invention allows a mask which can follow the shape of the molded lenslet array and improve the accuracy of the mask both in location and edge definition.

The invention and its objects and advantages will become more apparent in the detailed description of the preferred embodiment presented below.

BRIEF DESCRIPTION OF THE DRAWINGS

A more complete understanding of the invention and its advantages will become apparent from the detailed description taken in conjunction with the accompanying drawings, wherein examples of the invention are shown, and identical reference numbers have been used, where possible, to designate identical elements that are common to the figures referenced below.

DETAILED DESCRIPTION OF THE INVENTION

The present invention will be directed in particular to elements forming part of, or in cooperation more directly with an apparatus in accordance with the present invention. It is to be understood that elements not specifically shown or described may take various forms well known to those skilled in the art.

Figure 1:
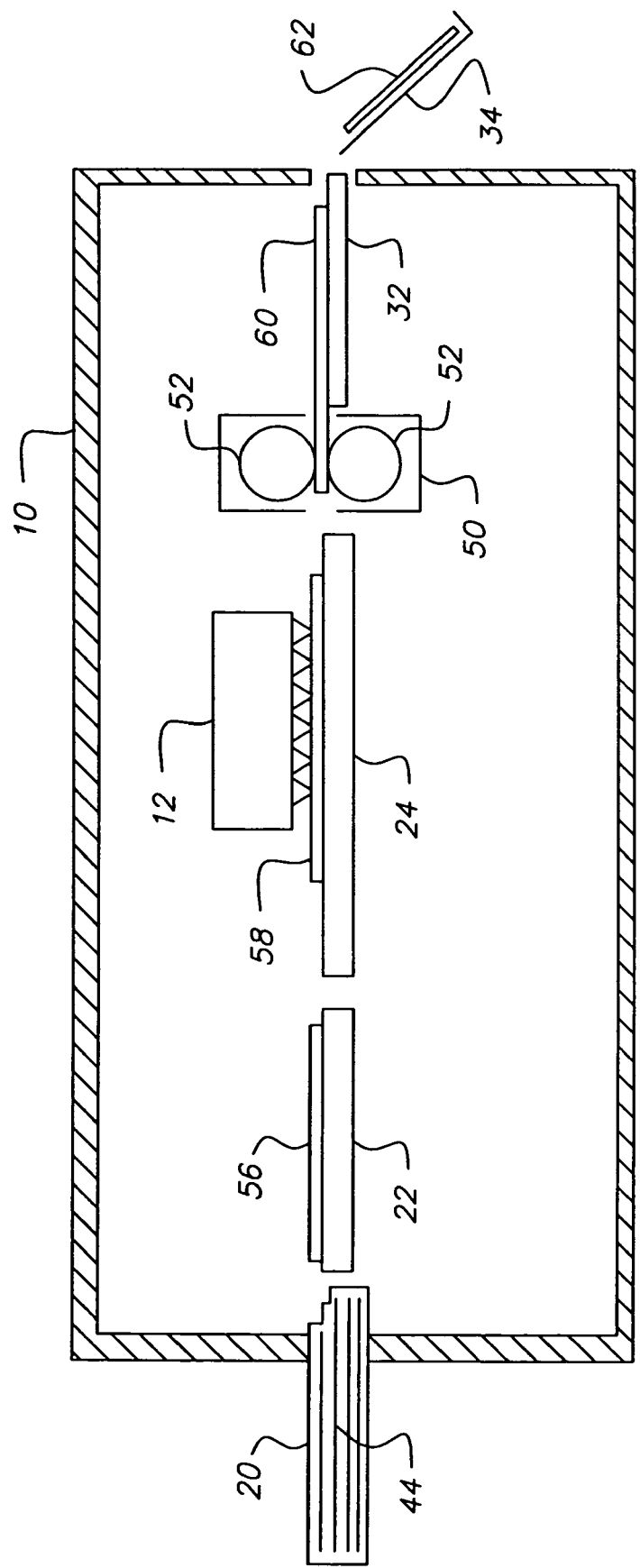
FIG. 1 is a schematic, cross-sectional view of an imaging apparatus having a multiple channel image exposure device according to the present invention.

Referring now to FIG. 1, a schematic, cross-sectional view of an imaging apparatus 10 for exposing a photosensitive media 44 utilizing a multiple channel image exposure device 12 is shown. The multiple channel image exposure device has a molded lenslet array 14 with a printed mask. Photosensitive media 44 is removed from media tray 20 to a preheat station 22. Once the preheat step is complete the preheated photosensitive media 56 proceeds to the exposure station 24 to be image wise exposed by the multiple channel image exposure device 12. The exposed photosensitive media 58 is then passed through the microcapsule rupturing device 50 where pressure is applied by rupturing rollers 52. The developed photosensitive media 60 is then passed to the post-heating section 32 and from there to the exit tray 34 as competed image 62.

Figure 2:
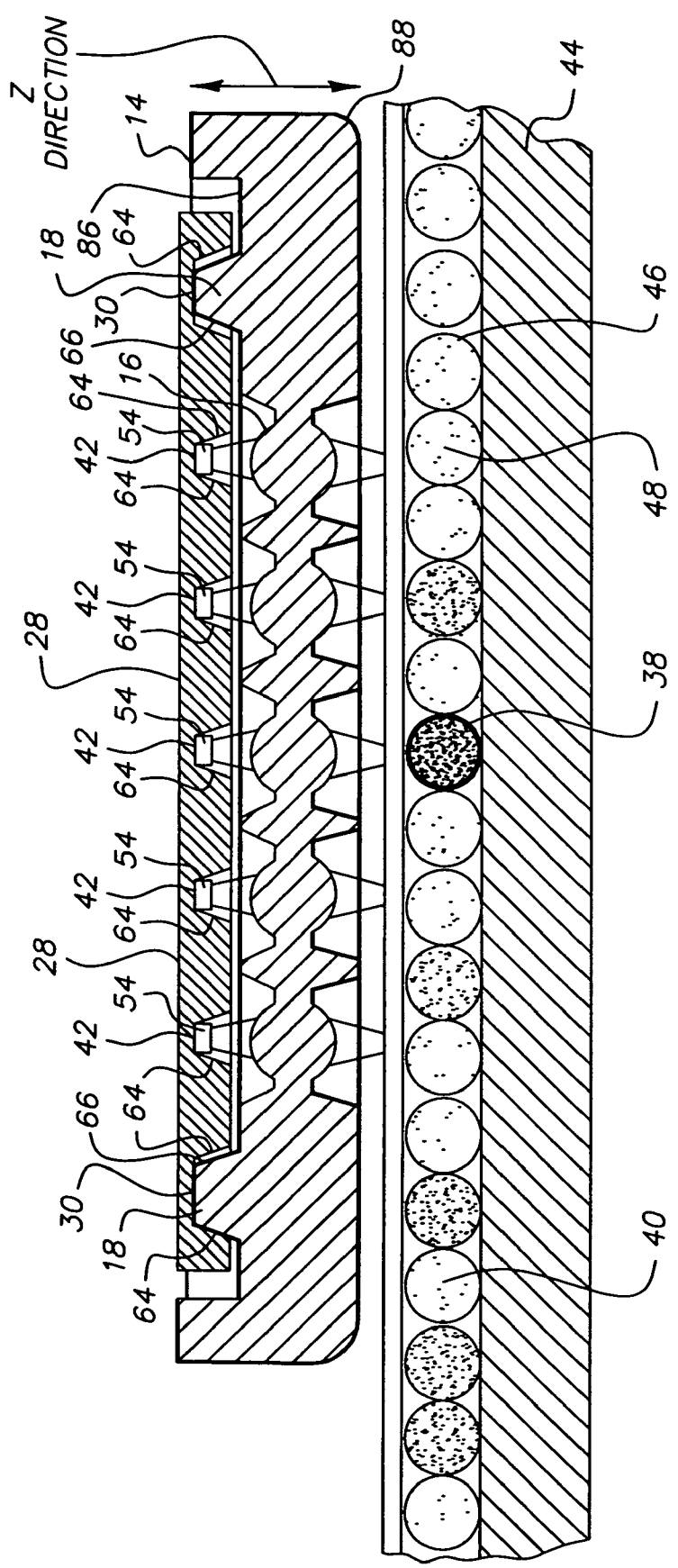
FIG. 2 is a schematic, cross-sectional view of a multiple channel image exposure device of one embodiment according to the present invention.

FIG. 2 shows a schematic cross sectional view of a multiple channel image exposure device 12 shown in FIG. 1. Multiple channel image exposure device 12 has a molded lenslet array 14. An input printed mask 86 and output printed mask 88 are in alignment with an array of light emitting elements 54 that are mounted on silicon pad 28 within light source alignment recesses 42. Light emitting elements 54 are attached by means of soldering, adhesive bonding, or other methods well known in the art. Light emitting elements may be laser diodes or light emitting diodes (LEDs).

Registration of the molded lenslet array 14 to the array of light emitting elements 54 is accomplished by registration pins 18 that interface with locating recesses 30. Registration recesses 30 and light source alignment recesses 42 are etched into silicon pad 28 by a micro-lithographic mask and fabrication process. The micro-lithographic mask and fabrication process form the tapered sidewalls 64 of the registration recesses 30 and light source alignment recesses 42 at an angle between 45 degrees–75 degrees. Both the registration recesses 30 and light source alignment recesses 42 will be formed at the same slope angle and the same depth such that the length of the registration pins 18 and the depth of the registration recesses 30 locate the imaging lenses 16 formed in the molded lenslet array 14 to a predetermined distance in the Z direction from the array of light emitting elements 54. In the preferred embodiment the molded lenslet array 14 is molded of a polyolefin or other materials well known by someone in the art.

The photosensitive media 44 is of the type having a plurality of microcapsules 46 with an image-forming material 48 encapsulated within the microcapsules 46. Image wise exposure of the certain microcapsules 46 in photosensitive media 44 hardens the exposed microcapsules 38 to a point such that when processed through a microcapsule rupturing device 50 that utilizes rupturing roller 52 to generate pressure to rupture unexposed microcapsules 40, the exposed microcapsules 38 remain unbroken. The unexposed microcapsules 40 release the image-forming material 48 encapsulated within the unexposed microcapsules 40 to form an image within the photosensitive media 44.

Figure 3:
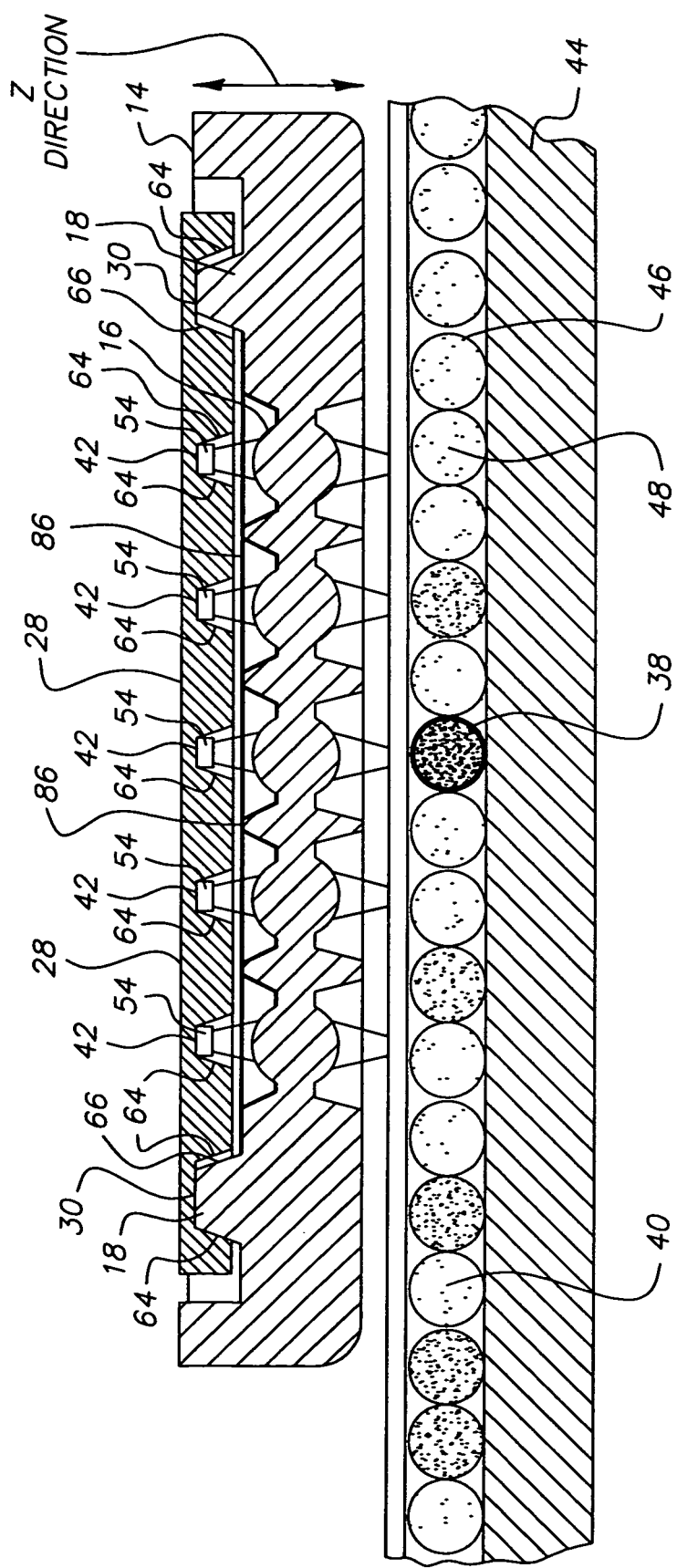
FIG. 3 is a schematic, cross-sectional view of a multiple channel image exposure device according to another embodiment of the present invention.

FIG. 3 shows a schematic cross sectional view of a multiple channel image exposure device 12 shown in FIG. 1 having a molded lenslet array 14 with an input printed mask 86 printed with an ink or other material to prevent cross talk from one imaging lens 16 to another imaging lens 16. The mask material is preferably light absorbing material and blocks the wave length required to be absorbed. The material may also be reflective.

Figure 4:
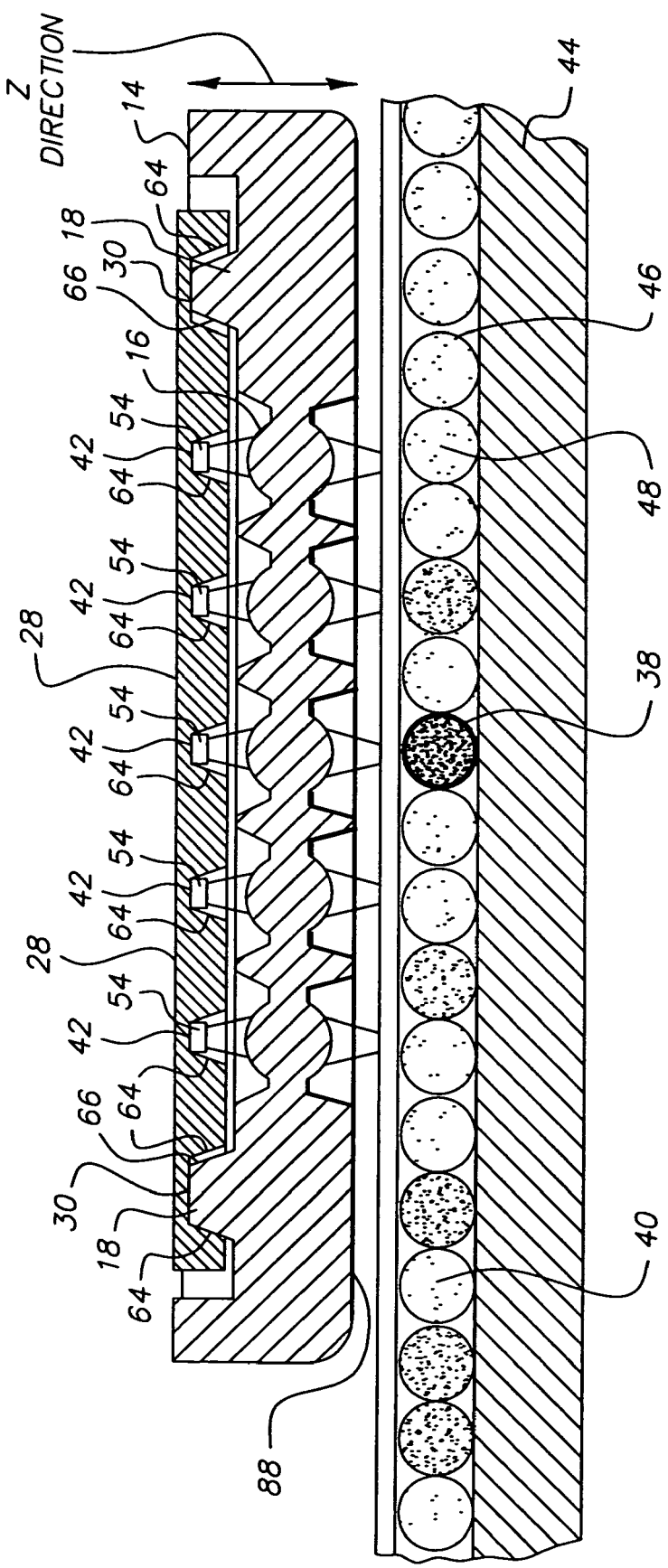
FIG. 4 is a schematic, cross-sectional view of a multiple channel image exposure device according to yet another one embodiment of the present invention.

FIG. 4 is a schematic cross sectional view of a multiple channel image exposure device 12 shown in FIG. 1 having a molded lenslet array 14. In this embodiment, an output printed mask 88 is printed with an ink or other material to prevent cross talk from one imaging lens 16 to another imaging lens 16 and should be noted that a printed mask may only cover selected surfaces 66 or a portion of a selected surface as needed.

Figure 5:
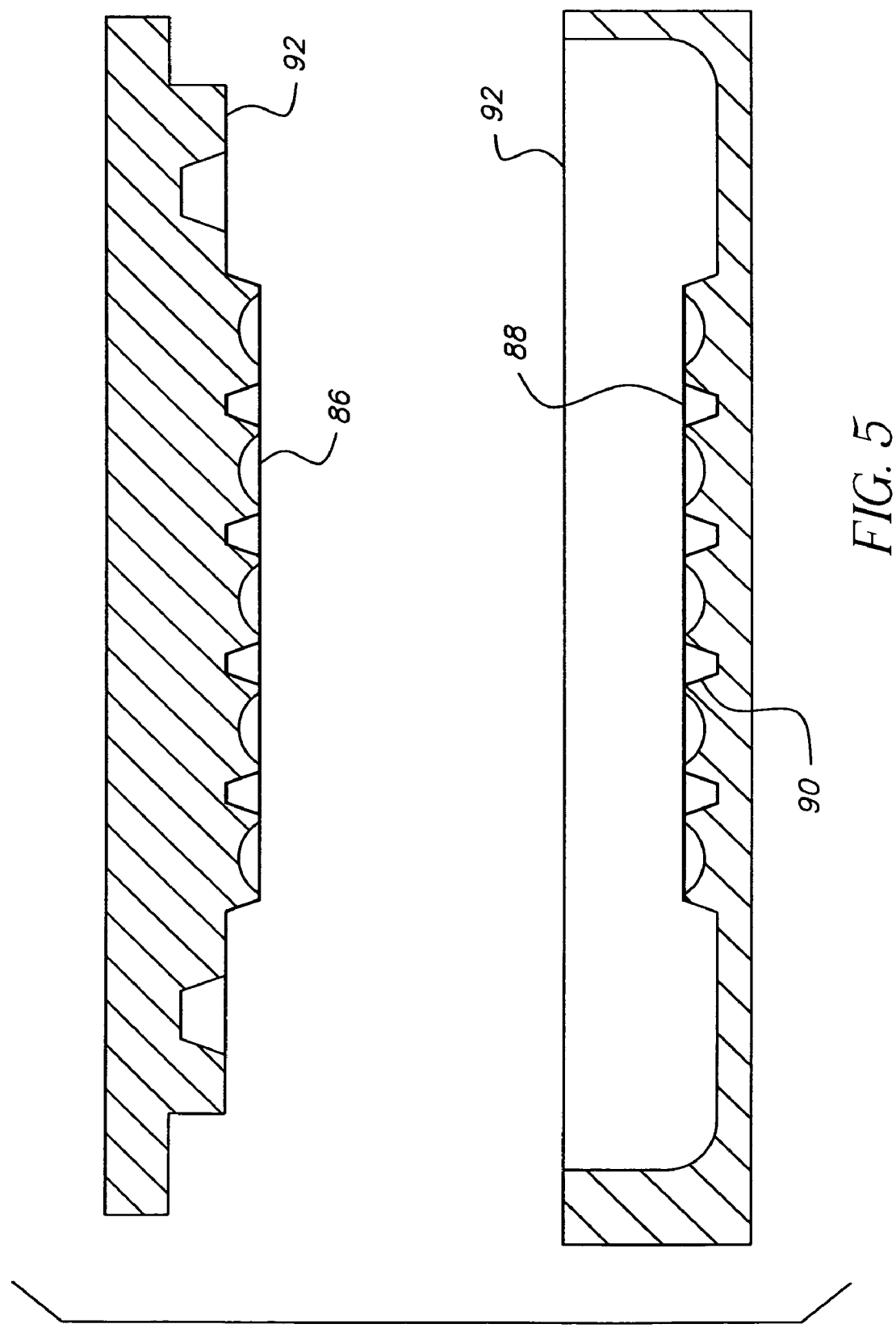
FIG. 5 is a schematic, cross-sectional view of a mold for multiple channel image exposure device according to the present invention.

FIG. 5 shows a schematic cross sectional a view of a mold 92 for molded lenslet array 14. Ink 90 is on the portions of the mold that form the printed input mask 86 and the printed output mask 88 such that when the molded lenslet array 14 is molded the mask is formed on the molded lenslet array 14. The printed mask may also be printed on the on the molded lenslet array by making a negative from the molded lenslet array 14, applying ink to the negative, then printing on the molded lenslet 14.

The invention has been described in detail with particular reference to certain preferred embodiments thereof, but it will be understood that variations and modifications can be effected within the scope of the invention.

PARTS LIST

10. Imaging apparatus
12. Multiple channel image exposure device
14. Molded lenslet array
16. Imaging lens
18. Registration pin
20. Media tray
22. Preheat station
24. Exposure station
28. Silicon pad
30. Registration recess
32. Post-heating station
34. Media exit tray
38. Exposed microcapsule
40. Unexposed microcapsule
42. Light source alignment recess
44. Photosensitive media
46. Microcapsule
48. Image-forming material
50. Microcapsule rupturing device
52. Rupturing roller
54. Array of light emitting elements
56. Pre-heated photosensitive media
58. Exposed photosensitive media
60. Developed photosensitive media
62. Completed image
64. Tapered sidewalls
66. Tapered locating surface
86. Input printed mask
88. Output printed mask
90. Ink
92. Mold

What is claimed is:

1. A method of manufacturing a molded lenslet array comprising the steps of:
   printing a mask on a mold;
   molding said lenslet array with a shape; and
   transferring said mask from said mold to said lenslet array, wherein the mask is applied to accurately align a light source and the lenslet array, and wherein the mask follows the shape of the lenslet array to improve location and edge of definition of exposure of light to a photosensitive media.

2. A method as in claim 1 wherein said mask is printed with an ink.

3. A method as in claim 1 wherein said mask is printed with an energy absorbing material.

4. A method as in claim 1 wherein said mask is printed with a energy reflective material.

5. A method as in claim 1 wherein said molded lenslet array is comprised of polyolefin.

6. A method as in claim 1 wherein said mask is printed only on an input side of said molded lenslet array.

7. A method as in claim 1 wherein said mask is printed only on an output side of said molded lenslet array.

8. A method as in claim 1 wherein said mask is printed on an input and output side of said molded lenslet array.

* * * * *